United States Patent
Okazaki et al.

(10) Patent No.: US 12,166,223 B2
(45) Date of Patent: Dec. 10, 2024

(54) VEHICULAR BATTERY CASE AND METHOD FOR MANUFACTURING VEHICULAR BATTERY CASE

(71) Applicant: AISIN CORPORATION, Aichi (JP)

(72) Inventors: Hiroshi Okazaki, Kariya (JP); Masato Oishi, Kariya (JP); Kanna Nagatsuka, Kariya (JP)

(73) Assignee: AISIN CORPORATION, Kariya (JP)

( * ) Notice: Subject to any disclaimer, the term of this patent is extended or adjusted under 35 U.S.C. 154(b) by 396 days.

(21) Appl. No.: 17/692,619

(22) Filed: Mar. 11, 2022

(65) Prior Publication Data
US 2022/0320653 A1 Oct. 6, 2022

(30) Foreign Application Priority Data
Mar. 30, 2021 (JP) ................. 2021-057834

(51) Int. Cl.
*H01M 50/209* (2021.01)
*B60L 50/64* (2019.01)
(Continued)

(52) U.S. Cl.
CPC .......... *H01M 50/209* (2021.01); *B60L 50/64* (2019.02); *H01M 50/238* (2021.01);
(Continued)

(58) Field of Classification Search
CPC ............. H01M 50/209; H01M 50/238; H01M 50/242; H01M 50/249; H01M 50/224;
(Continued)

(56) References Cited

U.S. PATENT DOCUMENTS

| 9,533,631 B2 * | 1/2017 | Kamimura | H01M 50/249 |
| 9,758,028 B2 * | 9/2017 | Ikeda | B62D 29/043 |
| 10,547,039 B2 * | 1/2020 | Toyota | B60K 1/04 |

FOREIGN PATENT DOCUMENTS

| CN | 118231917 A | * | 6/2024 | | |
| EP | 2608311 B1 | * | 6/2017 | ......... | H01M 10/486 |

(Continued)

OTHER PUBLICATIONS

U.S. Appl. No. 17/692,682, filed Mar. 11, 2022.

*Primary Examiner* — James A Shriver, II
*Assistant Examiner* — Michael T. Walsh
(74) *Attorney, Agent, or Firm* — Finnegan, Henderson, Farabow, Garrett and Dunner, LLP

(57) ABSTRACT

A vehicular battery case includes inner and outer bottom plate portions, a lower frame, and a frame body. The outer bottom plate portion is on a lower side of the inner bottom plate portion. The lower frame is between the inner and outer bottom plate portions. The frame body stands upward from outer peripheral portions of the inner and outer bottom plate portions. The frame body includes a lower portion including a first joint surface joined to the inner bottom plate portion and a second joint surface on an outer side of the first joint surface and joined to the outer bottom plate portion. The lower frame includes an upper end portion including a first flange portion including an upper surface facing a lower surface of the inner bottom plate portion. The first flange portion is joined to the lower surface of the inner bottom plate portion.

9 Claims, 9 Drawing Sheets

(51) Int. Cl.
*H01M 50/238* (2021.01)
*H01M 50/242* (2021.01)
*H01M 50/249* (2021.01)
*H01M 50/224* (2021.01)

(52) U.S. Cl.
CPC ....... *H01M 50/242* (2021.01); *H01M 50/249* (2021.01); *H01M 50/224* (2021.01)

(58) Field of Classification Search
CPC .......... H01M 50/204; H01M 2220/20; H01M 10/613; H01M 10/615; H01M 10/625; H01M 10/6556; H01M 10/6568; H01M 50/244; H01M 50/258; B60L 50/64; B60K 2001/0438; B60K 6/28; B60K 2001/005
See application file for complete search history.

(56) References Cited

FOREIGN PATENT DOCUMENTS

| | | | | | |
|---|---|---|---|---|---|
| JP | 4191411 | B2 | * | 12/2008 | |
| JP | 2019110003 | A | * | 7/2019 | |
| JP | 2020113410 | A | * | 7/2020 | ............. A01N 43/84 |
| JP | 2021051839 | A | * | 4/2021 | |
| KR | 20200033778 | A | * | 3/2020 | |

* cited by examiner

VEHICULAR BATTERY CASE AND METHOD FOR MANUFACTURING VEHICULAR BATTERY CASE

CROSS REFERENCE TO RELATED APPLICATIONS

This application is based on and claims priority under 35 U.S.C. § 119 to Japanese Patent Application No. 2021-057834, filed on Mar. 30, 2021, the entire content of which is incorporated herein by reference.

TECHNICAL FIELD

This disclosure generally relates to a vehicular battery case and a method for manufacturing a vehicular battery case.

BACKGROUND DISCUSSION

JP2019-110003A (Reference 1) discloses a battery case including side frames and a bottom plate member. The bottom plate member disclosed in Reference 1 has a sandwich structure in which a core material is sandwiched between a first plate and a second plate. The first plate includes two metal plates and elliptical-tubule-shaped pipes sandwiched between these two metal plates, and a cooling medium path for cooling a battery is formed, by the pipes, inside the first plate. The first plate and the second plate are fixed to a side cover, and thereby the bottom plate member is fixed to the side frames.

Since many steps are required in order to manufacture the battery case of Reference 1, there is a problem that manufacturing cost increases. Specifically, in order to manufacture the battery case of Reference 1, necessary steps include a step of manufacturing the first plate in which the cooling medium paths are formed of the two metal plates and a plurality of the elliptical pipes, a step of manufacturing the bottom plate member by superimposing the first plate, the core material, and the second plate to one another, and a step of joining the manufactured bottom plate member to the side frames. Reference 1 further discloses a method of joining the first plate to the side frames by rivets, and joining the second plate to the side frames by rivets or caulking. In such a method, the first plate of the bottom plate member needs to be joined to the side frames from an upper side, and the second plate of the bottom plate member needs be joined to the side frames from a lower side. For this reason, a position and an orientation of each member need to be changed in the course of the manufacturing, thus increasing the number of steps.

A need thus exists for a vehicular battery case and a method for manufacturing the same which are not susceptible to the drawback mentioned above.

SUMMARY

A vehicular battery case according to this disclosure includes a plate-shaped inner bottom plate portion, a plate-shaped outer bottom plate portion, a lower frame, and a frame body. A battery is mountable on an upper surface side of the inner bottom plate portion. The outer bottom plate portion is arranged on a lower side of the inner bottom plate portion in such a way as to be separated from the inner bottom plate portion. The lower frame is arranged between the inner bottom plate portion and the outer bottom plate portion. The frame body is provided in such a way as to stand upward from outer peripheral portions of the inner bottom plate portion and the outer bottom plate portion. The frame body includes a lower portion where first and second joint surfaces are formed. The first joint surface faces upward or downward. The second joint surface faces downward, and is on an outer side of and on a lower side of the first joint surface in the frame body. The lower frame includes an upper end portion provided with a first flange portion including an upper surface facing a lower surface of the inner bottom plate portion. The inner bottom plate portion includes the outer peripheral portion that is joined to the first joint surface in a state of overlapping the first joint surface in an up-down direction. The outer bottom plate portion includes the outer peripheral portion that is joined to the second joint surface in a state of overlapping the second joint surface in an up-down direction. The first flange portion of the lower frame is joined to the lower surface of the inner bottom plate portion.

A method for manufacturing a vehicular battery case according to this disclosure is a method for manufacturing a vehicular battery case that includes a plate-shaped inner bottom plate portion, a plate-shaped outer bottom plate portion, a lower frame, and a frame body. The inner bottom plate portion is configured in such a way that a battery is mountable on an upper surface side of the inner bottom plate portion. The outer bottom plate portion is arranged on a lower side of the inner bottom plate portion in such a way as to be separated from the inner bottom plate portion. The lower frame is arranged between the inner bottom plate portion and the outer bottom plate portion, and includes an upper end portion provided with a first flange portion including an upper surface facing a lower surface of the inner bottom plate portion. The frame body is provided in such a way as to stand upward from outer peripheral portions of the inner bottom plate portion and the outer bottom plate portion. The frame body includes a lower portion where first and second joint surfaces are formed. The first joint surface faces upward or downward. The second joint surface faces downward, and is on an outer side of and on a lower side of the first joint surface in the frame body. The method includes a step of joining the inner bottom plate portion to the frame body by applying a laser from a lower side to the outer peripheral portion of the inner bottom plate portion arranged in such a way as to overlap the first joint surface. The method further includes a step of joining the lower frame to the inner bottom plate portion by applying a laser from a lower side to the first flange portion of the lower frame arranged on a lower side of the inner bottom plate portion. The method further includes a step of joining the outer bottom plate portion to the frame body by applying a laser from a lower side to the outer peripheral portion of the outer bottom plate portion arranged in such a way as to overlap the second joint surface from a lower side.

A vehicular battery case according to this disclosure includes a plate-shaped inner bottom plate portion, a plate-shaped outer bottom plate portion, a lower frame, and a frame body. A battery is mountable on an upper surface side of the inner bottom plate portion. The outer bottom plate portion is arranged on a lower side of the inner bottom plate portion in such a way as to be separated from the inner bottom plate portion. The lower frame is arranged between the inner bottom plate portion and the outer bottom plate portion. The frame body is provided in such a way as to stand upward from outer peripheral portions of the inner bottom plate portion and the outer bottom plate portion. The frame body includes a lower portion where first and second joint surfaces are formed. The first joint surface is joined to the inner bottom plate portion. The second joint surface is on an outer side of the first joint surface in the frame body, and is joined to the outer bottom plate portion. The lower frame includes an upper end portion provided with a first flange portion including an upper surface facing a lower surface of the inner bottom plate portion. The first flange portion of the lower frame is joined by a laser to the lower surface of the inner bottom plate portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A vehicular battery case 10a according to this embodiment is used for accommodating a battery mounted on an electric vehicle (such as an EV, a plug-in hybrid vehicle (PHV), or a hybrid vehicle (HV)). The vehicular battery case 10a according to this embodiment is arranged at a floor portion (on a lower side of a seat) of the vehicle. The vehicular battery case 10a according to the embodiment of this disclosure is configured in such a way as to include a path (hereinafter, referred to as "temperature control path 20") through which fluid (hereinafter, referred to as "temperature control fluid") such as water for temperature control can flow, and to enable temperature control (cooling and heating) of the battery by making the temperature control fluid flow through the temperature control path 20.

In the following description, each direction of the vehicular battery case 10a according to this embodiment is based on a reference direction (i.e., a direction of the vehicle) in a state of being attached to the vehicle. In each of the drawings, a front side of the vehicle-mounted battery case 10a according to the embodiment of this disclosure is indicated by the arrow Fr, a rear side of the battery case 10a is indicated by the arrow Rr, an upper side of the battery case 10a is indicated by the arrow Up, a lower side of the battery case 10a is indicated by the arrow Dw, a right side of the battery case 10a is indicated by the arrow R, and a left side of the battery case 10a is indicated by the arrow L. In the following description, the vehicular battery case 10a according to the embodiment of this disclosure is abbreviated simply as "battery case 10a".

Figure 1:
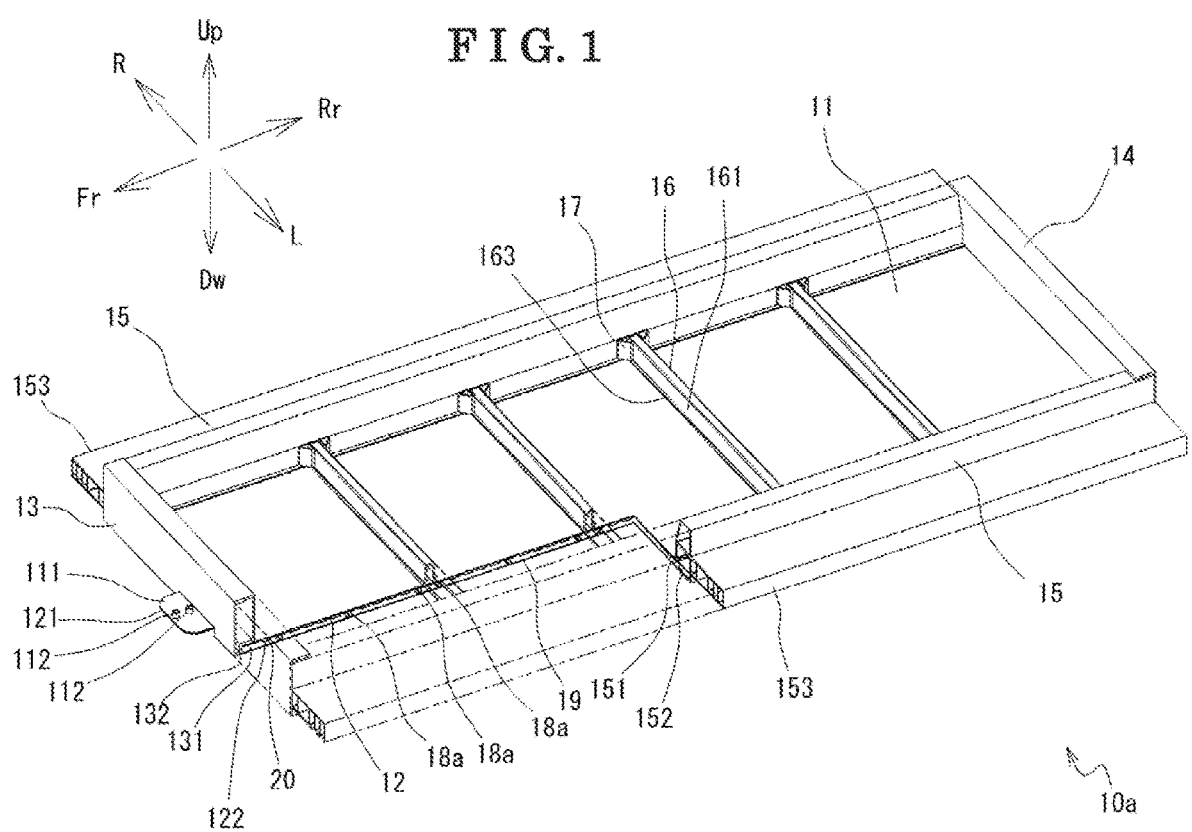
FIG. 1 is an external-appearance perspective view illustrating a configuration of a battery case according to an embodiment of this disclosure.
Figure 2:
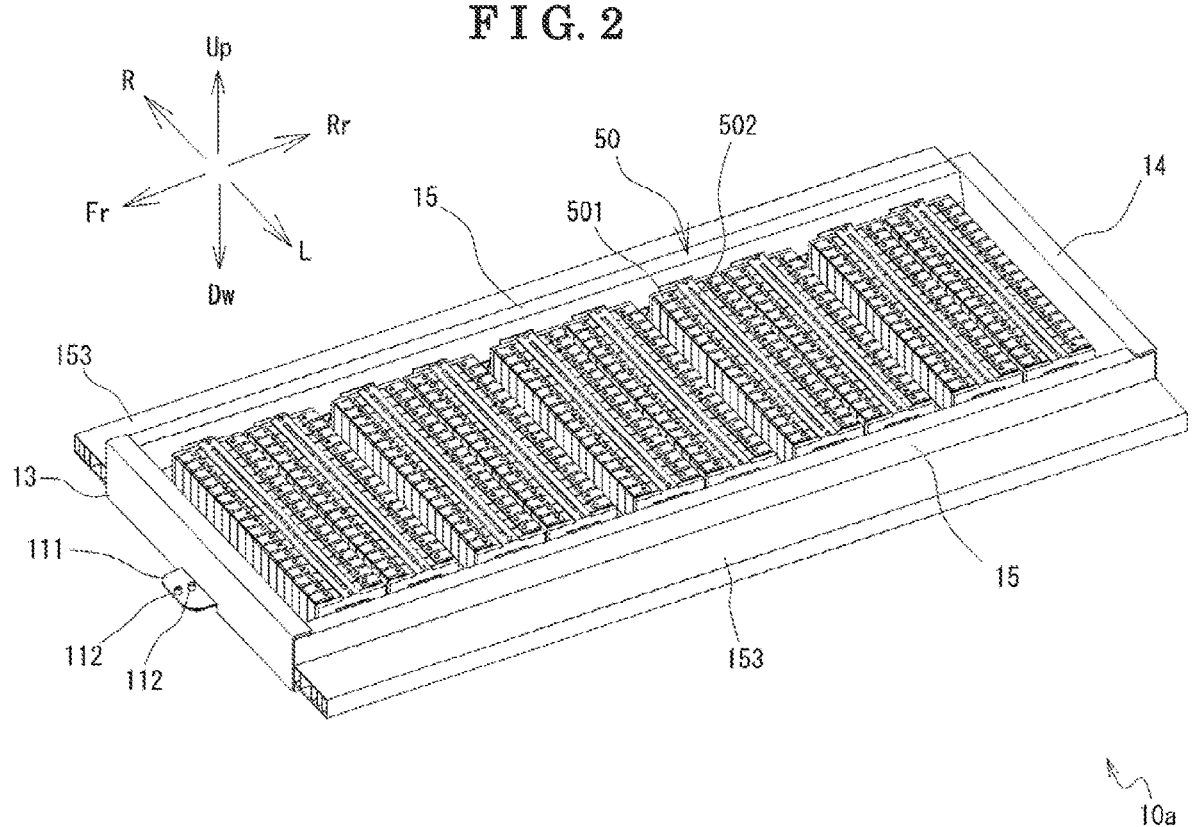
FIG. 2 is an external-appearance perspective view illustrating the configuration of the battery case according to the embodiment of this disclosure and illustrating a state where a battery is accommodated.
Figure 3:
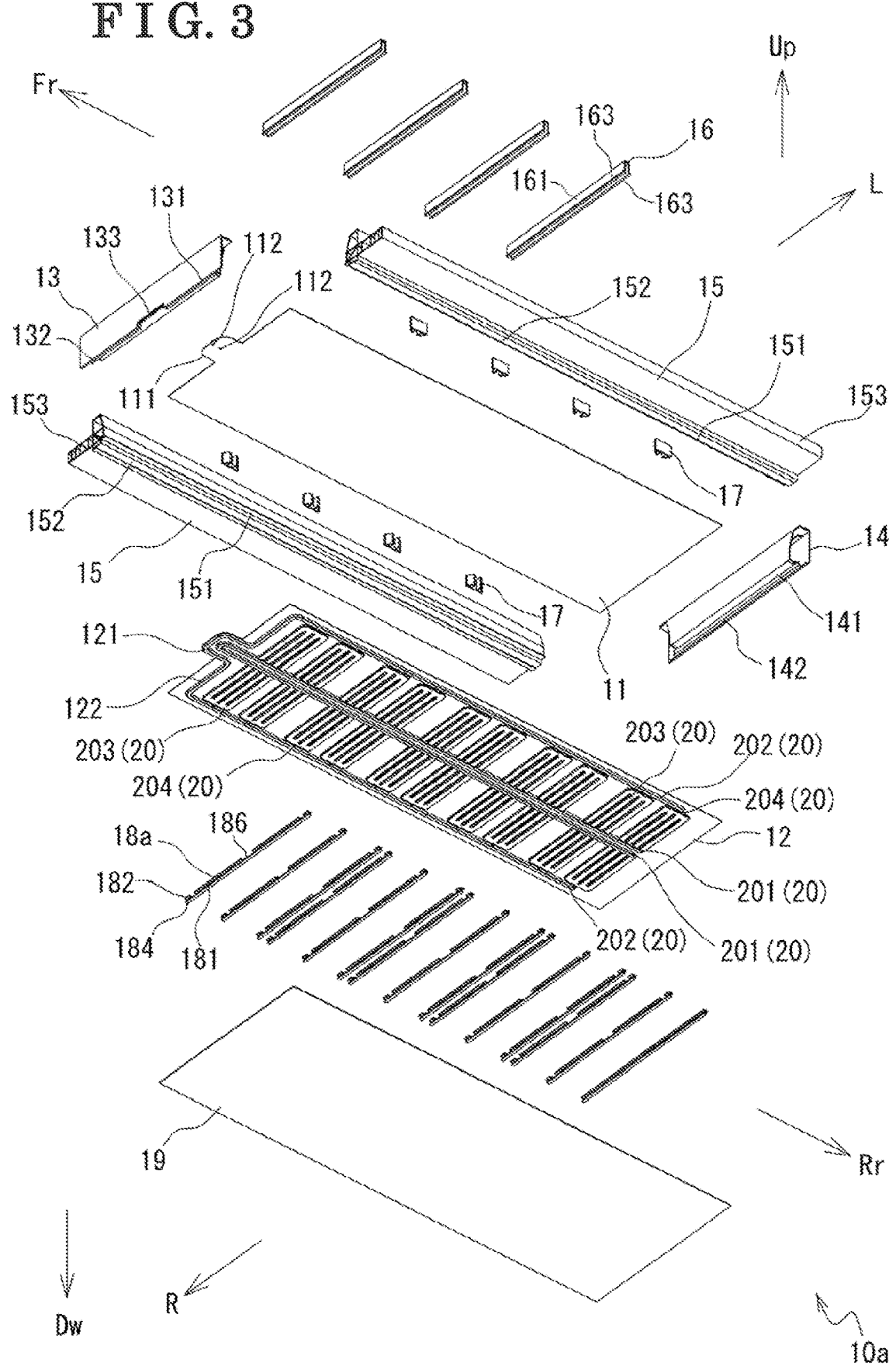
FIG. 3 is an exploded perspective view illustrating the configuration of the battery case of this disclosure.

First, an entire configuration of the battery case 10a is described. FIG. 1 is a perspective view illustrating the configuration of the battery case 10a. FIG. 2 is a perspective view illustrating a state where battery modules 50 are accommodated in the battery case 10a. FIG. 3 is an exploded perspective view illustrating the configuration of the battery case 10a, and is a view seen from a lower side.

As illustrated in FIG. 1 to FIG. 3, the battery case 10a includes a lower panel 11, a heat sink 12, a front frame 13, a rear frame 14, left and right side frames 15, a plurality of crossing members 16, a plurality of crossing-member support members 17, a plurality of lower frames 18a, and a shared panel 19. The battery case 10a has a substantially quadrilateral shape when viewed in the up-down direction, and has a bottomed box-shaped structure whose upper side is open. Specifically, the lower panel 11, the heat sink 12, the lower frames 18a, and the shared panel 19 form "the bottom portion of the box", and the front frame 13, the rear frame 14, and the left and right side frames 15 form "a side wall portion of the box". The front frame 13, the rear frame 14, and the left and right side frames 15 further form a frame body including an opening in the up-down direction on an inner peripheral side. The battery can be accommodated in an inside (i.e., an area surrounded by the front frame 13, the rear frame 14, and the left and right side frames 15) of this opening. On an upper side of the lower panel 11, a plurality of crossing members 16 are arranged in such a way as to be separated from each other at predetermined intervals in the front-rear direction. However, the battery case 10a may include a cover member that covers an upper side of the opening of the frame body formed by the front frame 13, the rear frame 14, and the left and right side frames 15.

The battery case 10a has a double-bottom structure including an inner bottom plate portion and an outer bottom plate portion that are separated from each other in the up-down direction. Specifically, the lower panel 11 and the heat sink 12 are superimposed on each other in the up-down direction and joined directly to each other. The superimposed body of the lower panel 11 and the heat sink 12 forms the inner bottom plate portion of the double-bottom structure. A temperature control path 20 is provided between the lower panel 11 and the heat sink 12. A configuration of the temperature control path 20 is described below. On a lower side of the superimposed body of the lower panel 11 and the heat sink 12, the shared panel 19 is arranged. The shared panel 19 forms the outer bottom plate portion of the double-bottom structure. A plurality of the lower frames 18a are arranged between the shared panel 19 (outer bottom plate portion) and the superimposed body (inner bottom plate portion) of the lower panel 11 and the heat sink 12. Spaces are formed between the shared panel 19 and the superimposed body of the lower panel 11 and the heat sink 12. In other words, the shared panel 19 (outer bottom plate portion) is arranged on a lower side of the superimposed body of the lower panel 11 and the heat sink 12 in such a way as to be separated from the superimposed body.

The lower panel 11 is configured in such a way that the battery modules 50 can be mounted on an upper surface side of the lower panel 11. The front frame 13, the rear frame 14, and the left and right side frames 15 are arranged along outer peripheries of the lower panel 11 and the heat sink 12 when viewed in the up-down direction, and are provided in such a way as to stand up from outer peripheral portions of these. The front frame 13, the rear frame 14, and the left and right side frames 15 form a frame including an opening that is on an inner peripheral side when viewed in the up-down direction and that can accommodate the battery modules 50. As illustrated in FIG. 2, the battery module 50 is an assembly where a plurality of battery cells 501 are integrally coupled to each other by protective members 502 or the like. Each of the battery modules 50 is substantially rectangular in the top view. The battery case 10a can accommodate a plurality of the battery modules 50 in such a way as to be arranged side by side in the front-rear direction at orientations of making longitudinal directions of the battery modules 50 parallel to the left-right direction of the battery case 10a. Specifically, the battery case 10a is configured in such a way as to accommodate the two battery modules 50 in each of areas between the crossing members 16 adjacent to each other, an area between the front frame 13 and the crossing member 16 located on the frontmost side, and an area between the rear frame 14 and the crossing member 16 located on the rearmost side.

Next, each member of the battery case 10a is described. As illustrated in FIG. 3, each of the lower panel 11 and the heat sink 12 is a plate-shaped member having a substantially quadrilateral shape when viewed in the up-down direction. The lower panel 11 and the heat sink 12 have substantially the same shapes and sizes as each other when viewed in the up-down direction. The lower panel 11 and the heat sink 12 are each formed of an aluminum plate, for example.

Extension portions 111 and 121 extending to the front side are provided at central portions in the left-right direction in front end portions (front-side edges) of the lower panel 11 and the heat sink 12. The extension portion 111 of the lower panel 11 includes two supply-discharge portions 112. These two supply-discharge portions 112 are holes for making an inside and an outside of the temperature control path 20 between the lower panel 11 and the heat sink 12 communicate with each other. Via these two supply-discharge portions 112, temperature control fluid can be supplied to the temperature control path 20 and be discharged from the temperature control path 20.

The heat sink 12 is provided with a path wall portion 122 forming the temperature control path 20. The path wall portion 122 is a recess including an opening on an upper side, and is formed by press working. Thus, the path wall portion 122 bulges to a lower side.

Each of the front frame 13, the rear frame 14, and the left and right side frames 15 is a hollow and long rod-shaped member, and is formed in such a way as to have a predetermined thickness in the width direction (the front-rear direction for the front frame 13 and the rear frame 14, and the left-right direction for the side frames 15) perpendicular to a direction along the outer peripheries of the lower panel 11, the heat sink 12, and the shared panel 19, when viewed in the up-down direction. Extruded aluminum materials for example are applied to the front frame 13, the rear frame 14, and the left and right side frames 15.

The front frame 13 and the rear frame 14 are arranged in such a way as to be separated from each other in the front-rear direction and be in parallel to each other at orientations of making longitudinal directions of the front frame 13 and the rear frame 14 parallel to the left-right direction (vehicle width direction). First joint surfaces 131 and 141 to which the lower panel 11 (the superimposed body of the lower panel 11 and the heat sink 12) is joined and second joint surfaces 132 and 142 to which the shared panel 19 is joined are formed at lower portions of the front frame 13 and the rear frame 14. Each of the first joint surfaces 131 and 141 and the second joint surfaces 132 and 142 is a strip-shaped flat surface long in the left-right direction, perpendicular to the up-down direction, and facing downward.

The first joint surfaces 131 and 141 and the second joint surfaces 132 and 142 are displaced from each other in the front-rear direction and the up-down direction, and do not overlap each other when viewed in the up-down direction. The second joint surfaces 132 and 142 are located on a lower side of the first joint surfaces 131 and 141. Specifically, at the lower portions of the front frame 13 and the rear frame 14, protrusion portions protruding downward are provided in such a way as to extend in the left-right direction along edges that are on sides opposite to mutually facing sides, i.e., on the outer sides (outer peripheral sides). In the lower portions of the front frame 13 and the rear frame 14, lower surfaces (on inner peripheral sides) other than the protrusion portions are the first joint surfaces 131 and 141, and lower surfaces (on outer peripheral sides) of the protrusion portions are the second joint surfaces 132 and 142. In the front frame 13, the first joint surface 131 is located on a rear side of the second joint surface 132, and in the rear frame 14, the first joint surface 141 is located on a front side of the second joint surface 142. In other words, the second joint surfaces 132 and 142 are on an outer side (outer peripheral side) of and on a lower side of the first joint surfaces 131 and 141 in the quadrilateral frame body formed by the front frame 13, the rear frame 14, and the left and right side frames 15.

The lower portion of the front frame 13 is provided with a recess portion 133 for avoiding interference with the extension portions 111 and 121 of the lower panel 11 and the heat sink 12. The recess portion 133 is open on the lower side in such a way that the lower panel 11 and the heat sink 12 can be attached from a lower side of the front frame 13.

The left and right side frames 15 are arranged in such a way as to be separated from each other in the left-right direction and be in in parallel to each other, with the longitudinal directions of these being oriented in parallel to the front-rear direction. A first joint surface 151 to which the lower panel 11 (the superimposed body of the lower panel 11 and the heat sink 12) is joined and a second joint surface 152 to which the shared panel 19 is joined are formed at lower portions of the left and right side frames 15. Each of the first joint surface 151 and the second joint surface 152 is a strip-shaped flat surface long in the front-rear direction, perpendicular to the up-down direction, and facing downward.

The first joint surface 151 and the second joint surface 152 are displaced from each other in the left-right direction and the up-down direction, and do not overlap each other when viewed in the up-down direction. The second joint surface 152 is located on a lower side of the first joint surface 151. Specifically, at the lower portions of the left and right side frames 15, protrusion portions protruding downward are provided in such a way as to extend in the front-rear direction along edges that are on sides opposite to mutually facing sides, i.e., on the outer sides (outer peripheral sides). In the lower portion of the left and right side frames 15, lower surfaces (on inner peripheral sides) other than the protrusion portions are the first joint surfaces 151, and lower surfaces (on outer peripheral sides) of the protrusion portions are the second joint surfaces 152. In the left side frame 15, the first joint surface 151 is located on a right side of the second joint surface 152, and in the right side frame 15, the first joint surface 151 is located on a left side of the second joint surface 152. In other words, the second joint surface 152 is on an outer side (outer peripheral side) of and on a lower side of the first joint surface 151 in the substantially quadrilateral frame body formed by the front frame 13, the rear frame 14, and the left and right side frames 15.

The left and right side frames 15 each include an energy absorption portion 153. The energy absorption portions 153 are portions that protrude to sides (i.e., outer sides in the vehicle width direction) opposite to mutually facing sides of the left and right side frames 15, that extend in the front-rear direction, and that are integrally connected to other portions. A space is formed inside the energy absorption 153. The energy absorbing portion 153 is configured in such a way as to alleviate impact applied to the battery modules 50 by being deformed when side collision or the like occurs.

A plurality of the crossing members 16 prevent or suppress the side frame 15 from being deformed and contacting with the battery module 50 by receiving a load in the left-right direction when side collision or the like occurs. A plurality of the crossing members 16 are each a long rod-shaped member, and extruded aluminum materials for example are applied to these. A plurality of the crossing members 16 extend in a rod shape along an upper surface of the lower panel 11 and are arranged side by side in the front-rear direction, with their longitudinal directions being oriented in parallel to the left-right direction.

Figure 4:
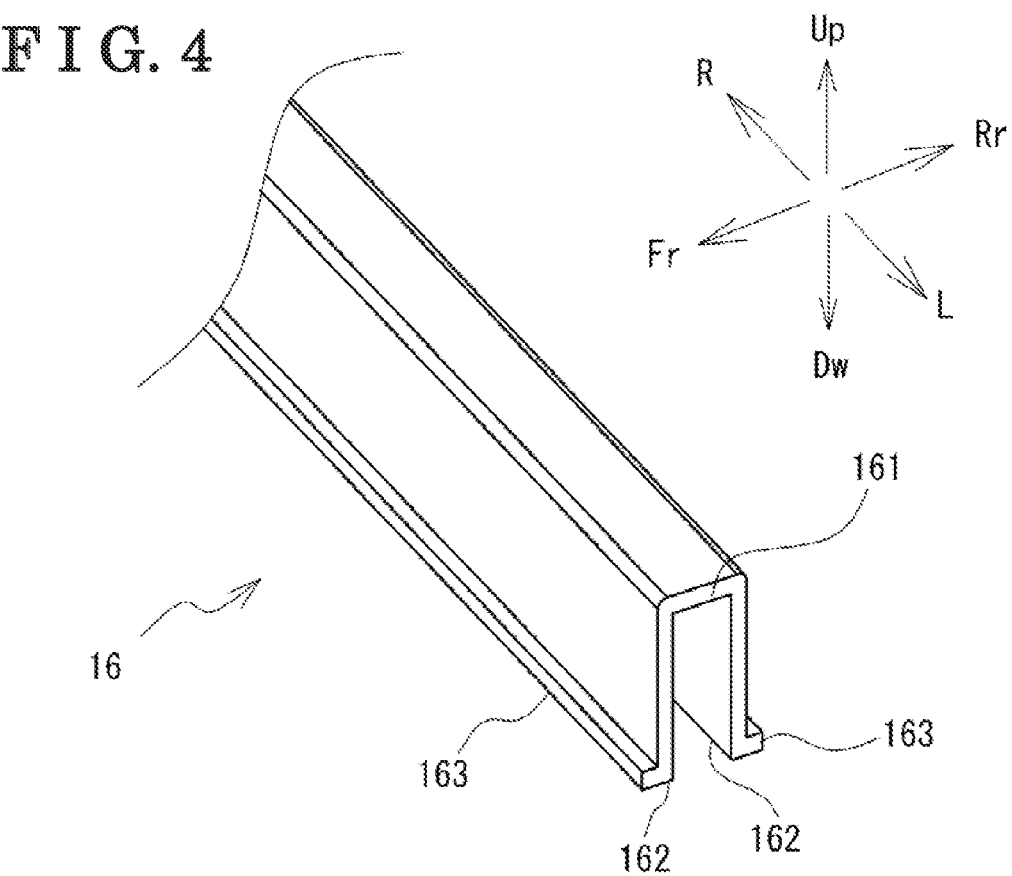
FIG. 4 is a perspective view illustrating a configuration of a crossing member.

FIG. 4 is a perspective view illustrating a structure of the crossing member 16. As illustrated in FIG. 4, the crossing member 16 has a substantially quadrilateral cross-sectional shape (i.e., an open cross-sectional shape) whose lower side is open. Specifically, the crossing member 16 includes a body portion 161 opening on the lower side, and a pair of opening ends 162 (two lower end portions separated from each other in the width direction) formed by opening of the lower side in the body portion 161. The crossing member 16 includes flange portions 163. The flange portions 163 extend to sides of separating, from each other, from a pair of the opening ends 162 (lower end portions) of the crossing member 16, and extend outward in the width direction (i.e., in the front-rear direction of the battery case 10a). The flange portions 163 of the crossing member 16 are provided in such a way as to extend over an entire length of the crossing member 16 in the longitudinal direction (i.e., the left-right direction of the battery case 10a). Lower surfaces of the flange portions 163 are flat surfaces perpendicular to the up-down direction.

The crossing-member support members 17 are members for fixing both respective longitudinal-direction ends of the respective crossing members 16 to the respective left and right side frames 15. Extruded aluminum materials for example are applied to the crossing-member support members 17. However, a specific configuration of the crossing-member support member 17 is not particularly limited. The respective crossing-member support members 17 may have configurations capable of fixing both respective ends of respective crossing members 16 to the left and right side frames 15.

Figure 5:
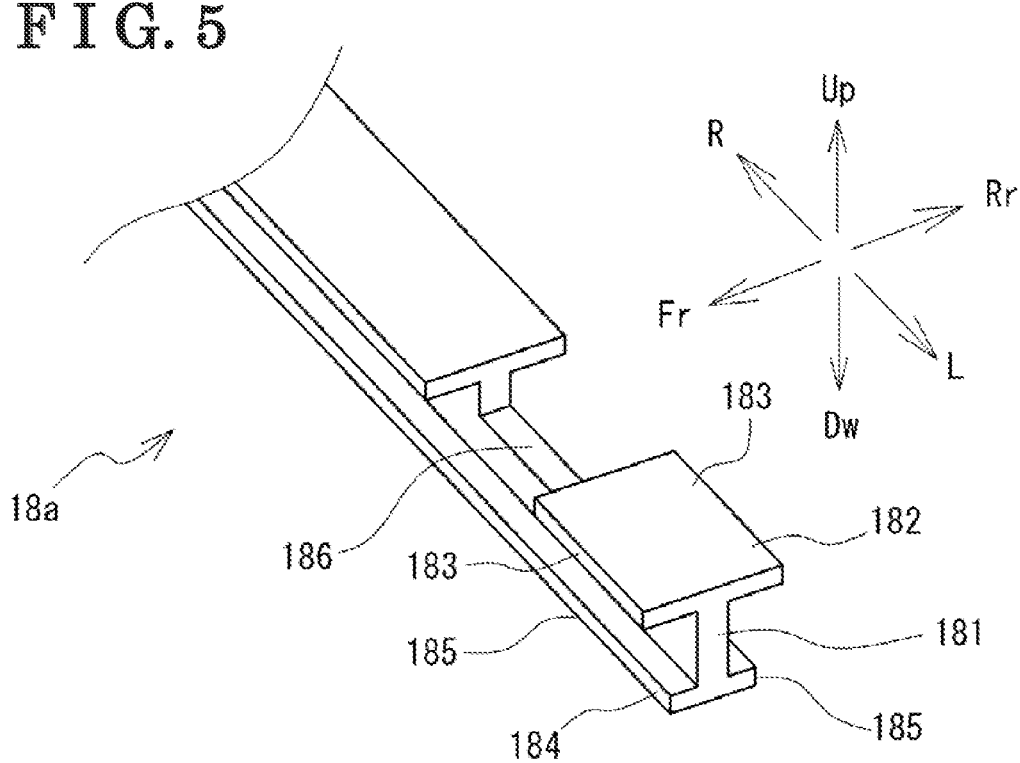
FIG. 5 is a perspective view illustrating a configuration of a lower frame.

The lower frame 18a is a member formed in a long-rod shape. An extruded aluminum material is applied to the lower frame 18a. FIG. 5 is a perspective view illustrating a configuration of the lower frame 18a. As illustrated in FIG. 5, the lower frame 18a includes a leg portion 181 having a standing-wall shape, a first flange portion 182, and a second flange portion 184. The leg portion 181 is formed in such a way as to extend in the standing wall shape in the up-down direction over the longitudinal direction of the lower frame 18a. The first flange portion 182 is formed at an upper end portion of the leg portion 181, and the second flange portion 184 is formed at a lower end portion of the leg portion 181. The first flange portion 182 is constituted by a pair of first protrusion portions 183 and 183 extending out from an upper end of the leg portion 181 in directions opposite to each other, to both outer sides in the width direction of the lower frame 18a (in the front-rear direction of the battery case 10a). The second flange portion 184 is constituted by a pair of second protrusion portions 185 and 185 extending out from a lower end of the leg portion 181 in directions opposite to each other, to both outer sides in the width direction of the lower frame 18a.

Each of an upper surface of the first flange portion 182 and a lower surface of the second flange portion 184 is a flat surface perpendicular to the up-down direction. A dimension of the first flange portion 182 in the width direction (the front-back direction with respect to the battery case 10a) is larger than a dimension of the second flange portion 184 in the width direction. Specifically, a width-direction length of the second protrusion portion 185 constituting the second flange portion 184 is shorter than a width-direction length of the first protrusion portion 183 constituting the first flange portion 182. The width-direction dimension of the first flange portion 182 is larger than the maximum width of the leg portion 181. Thus, when the lower frame 18a is viewed from a lower side, distal end portions of the first flange portion 182 in the width direction are seen without being hidden by the leg portion 181 and the second flange portion 184. In addition, the lower frame 18a is provided with a recess 186 for avoiding interference with the path wall portion 122 of the heat sink 12.

The shared panel 19 is a plate-shaped member having a substantially quadrilateral shape when viewed in the up-down direction. An aluminum plate for example is applied to the shared panel 19. A front-rear direction dimension and a left-right direction dimension of the shared panel 19 are respectively larger than front-rear direction dimensions and left-right direction dimensions of the lower panel 11 and the heat sink 12 excluding the extension portions 111 and 121.

Here, the temperature control path 20 is described. The lower panel 11 is superimposed on an upper side of the heat sink 12, and thereby, grooves formed by the path wall portion 122 are closed by the lower panel 11 (i.e., brought into a state of being covered). Thereby, the temperature control path 20 through which temperature control fluid can flow is formed between the lower panel 11 and the heat sink 12 (i.e., inside the inner bottom plate portion).

As illustrated in FIG. 3, the temperature control path 20 includes two central concentration paths 201, two outer peripheral concentration paths 202, and branch path groups 203 whose number is dependent on the number of battery modules 50 that can be accommodated (in this embodiment, twice the number of the battery modules 50 that can be accommodated).

The two central concentration paths 201 are located substantially in the centers of the lower panel 11 and the heat sink 12 in the left-right direction, and are substantially parallel to each other and extend in the front-rear direction. Front end portions of the two central concentration paths 201 are located at the extension portions 111 and 121 of the lower panel 11 and the heat sink 12. The two central concentration paths 201 communicate with each other at the extension portions 111 and 121. The two central concentration paths 201 communicates with an outside of the superimposed body of the lower panel 11 and the heat sink 12 by one of the two supply-discharge portions 112 at the extension portions 111 and 121.

The two outer peripheral concentration paths 202 include portions that are located near a left-right direction outer peripheries of the lower panel 11 and the heat sink 12 and that are substantially in parallel to each other and extend in the front-rear direction. The two outer peripheral concentration paths 202 extend, in the vicinity of these front end portions, in the left-right direction along the front ends of the lower panel 11 and the heat sink 12. The front end portions of the two outer peripheral concentration paths 202 are located at the extension portions 111 and 121 of the lower panel 11 and the heat sink 12, and communicate with each other at the extension portions 111 and 121. The two outer peripheral concentration paths 202 communicate with an outside of the superimposed body of the lower panel 11 and the heat sink 12 by the other of the two supply-discharge portions 112 at the extension portions 111 and 121.

Each of the branch path groups 203 includes a plurality of paths parallel to each other and extending in the left-right direction. The branch path groups 203 are provided between the central concentration path 201 on the right side and the outer peripheral concentration path 202 on the right side, and between the central concentration path 201 on the left side and the outer peripheral concentration path 202 on the left side. The branch path groups 203 are provided in a range where the battery modules 50 are mounted, when viewed in the up-down direction. Specifically, when viewed in the up-down direction, the respective branch path groups 203 are located between the lower frames 18a adjacent to each other, between the frontmost lower frame 18a and the front frame 13, and between the rearmost lower frame 18a and the rear frame 14.

Each path included in each branch path group 203 provided between the central concentration path 201 on the right side and the outer peripheral concentration path 202 on the right side includes one end portion (the left end portion, i.e., the end portion on a central side in the left-right direction) communicating with the central concentration path 201 on the right side. The respective paths included in each branch path group 203 provided between the central concentration path 201 on the right side and the outer peripheral concentration path 202 on the right side include the opposite end portions (the right end portions, i.e., the outer end portions in the left-right direction) that communicate with each other and that each communicate with the outer peripheral concentration path 202 on the right side via an orifice 205 at one position. Similarly, each path included in each branch path group 203 provided between the central concentration path 201 on the left side and the outer peripheral concentration path 202 on the left side includes one end portion (right end portion) communicating with the central concentration path 201 on the left side. The respective paths included in each branch path group 203 provided between the central concentration path 201 on the left side and the outer peripheral concentration path 202 on the left side include the opposite end portions (left end portions) that communicate with each other and that each communicate with the outer peripheral concentration path 202 on the left side via an orifice 205 at one position.

According to the temperature control path 20 having such a configuration, temperature control fluid that has flowed from one supply-discharge portion 112 into the two central concentration paths 201 flows through the two central concentration paths 201, and flows into each branch path group 203. Then, the temperature control fluid that has passed through the respective paths of the respective branch path groups 203 flows into the respective two outer peripheral concentration paths 202 through the orifices 205. The temperature control fluid that has flowed into the respective two outer peripheral concentration paths 202 is discharged to an outside of the temperature control path 20 through the other supply-discharge portion 112. The temperature control fluid exchanges heat with the battery modules 50 while flowing through the temperature control path 20 (particularly, while flowing through each path of each branch path group 203). Thereby, temperature of the battery modules 50 is adjusted. A flow direction of the temperature control fluid is not limited to the above-described direction, and may be the direction opposite to the above-described direction.

Next, an assembly structure of the battery case 10a is described along with a manufacturing method.

End portions of the front frame 13 and the rear frame 14 in the longitudinal direction (left-right direction) are joined to end portions of the left and right side frames 15 in the longitudinal direction (front-rear direction). Thus, the front frame 13, the rear frame 14, and the left and right side frames 15 form a frame body that is substantially quadrilateral when viewed in the up-down direction and that includes an opening on an inner peripheral side. A plurality of the crossing members 16 are arranged inside an area (opening) surrounded by the front frame 13, the rear frame 14, and the left and right side frames 15. A plurality of the crossing members 16 are arranged in such a way that their longitudinal directions are oriented in parallel to the left-right direction. Respective both end portions of a plurality of the crossing members 16 are joined to the left and right side frames 15 via the crossing-member support members 17. Laser welding for example can be applied for joining the front frame 13 and the rear frame 14 to the left and right side frames 15. Similarly, laser welding can be applied also for joining the respective crossing-member support members 17 to the left and right side frames 15, and joining the respective crossing members 16 to the respective crossing-member support members 17.

Figure 6:
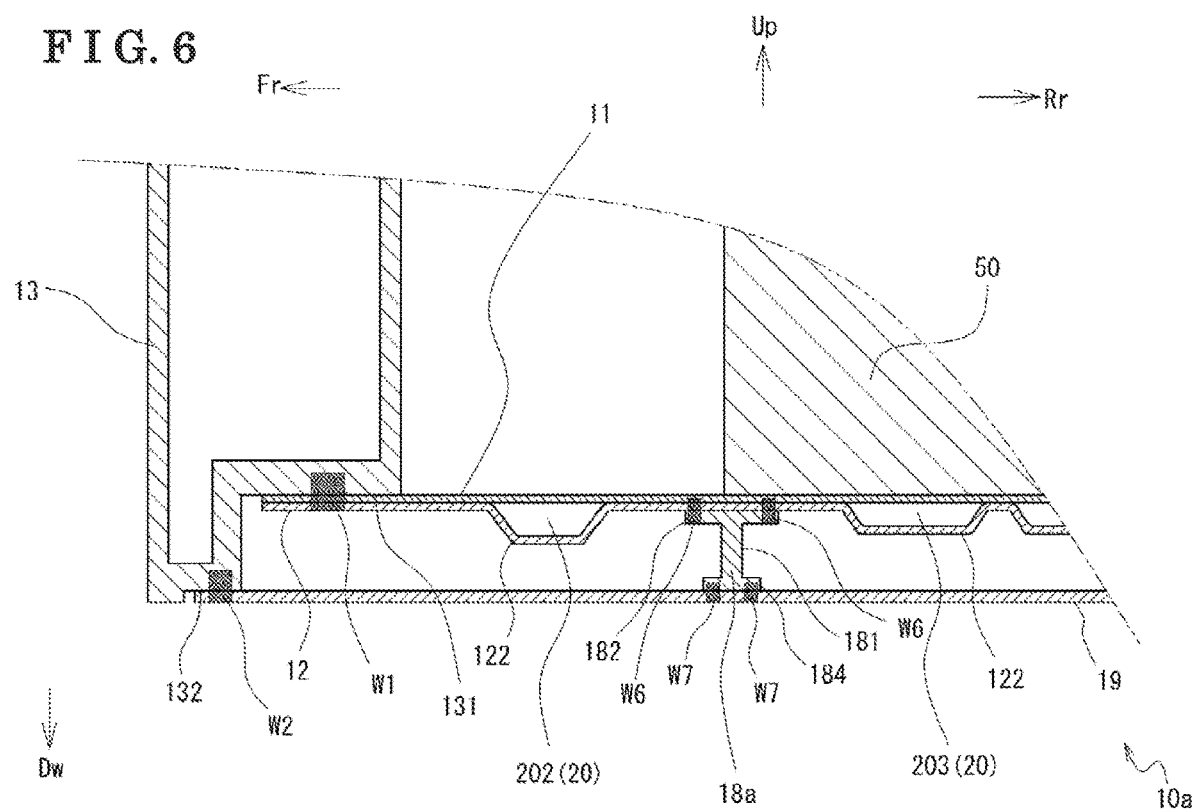
FIG. 6 is a sectional view illustrating the configuration of the battery case according to the embodiment of this disclosure.
Figure 7:
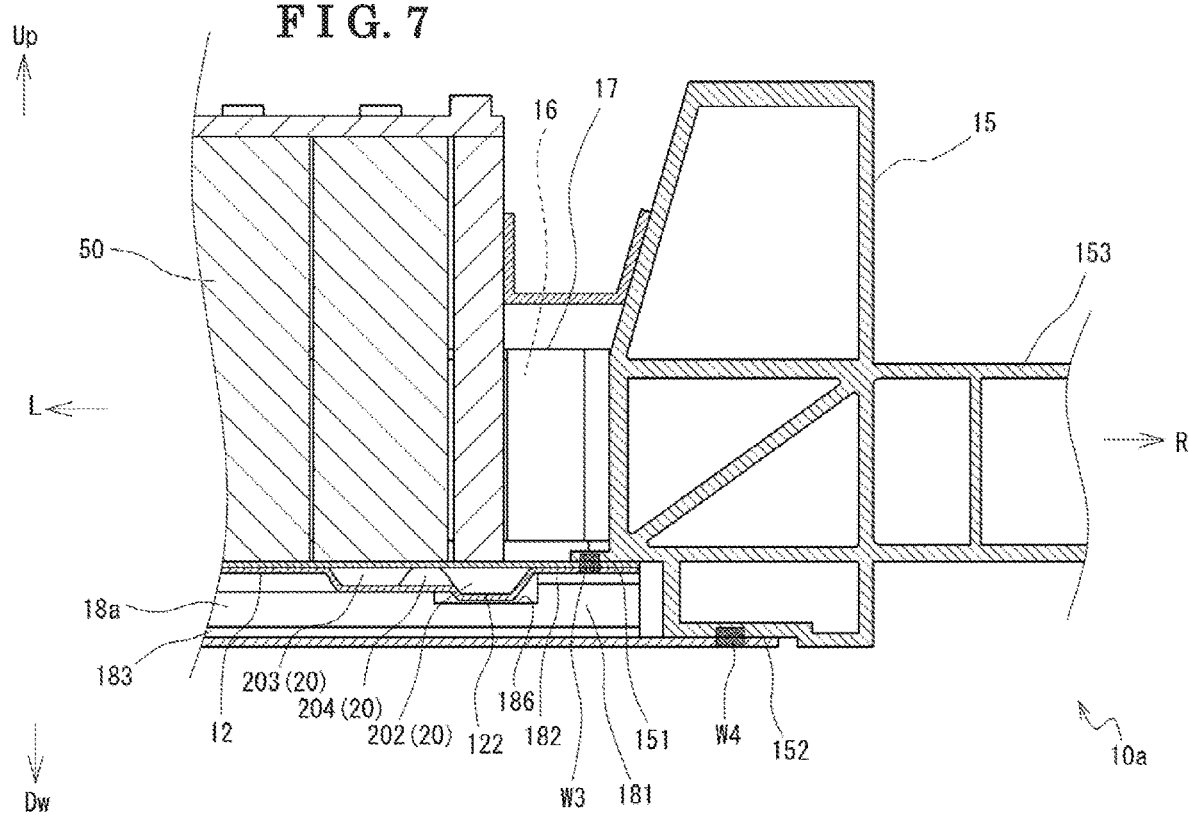
FIG. 7 is a sectional view illustrating the configuration of the battery case according to the embodiment of this disclosure.

FIG. 6 is a sectional view taken by cutting, along a plane perpendicular to the left-right direction, vicinity of the front end portion of the battery case 10a. FIG. 7 is a sectional view taken by cutting, along a plane perpendicular to the front-rear direction, vicinity of the right end portion of the battery case 10a. As illustrated in FIG. 6 and FIG. 7, the outer peripheral portion of the lower panel 11 overlaps, from a lower side, the front frame 13, the rear frame 14 (not illustrated), and the left and right side frames 15 (the left side frame 15 is not illustrated), and further, the heat sink 12 overlap the lower panel 11 from a lower side. More specifically, the lower panel 11 and the heat sink 12 are arranged in such a way that the front end portions (near the front edges) and the rear end portions (near the rear edges) in the outer peripheral portions of these overlap, from a lower side, the respective first joint surfaces 131 and 141 of the front frame 13 and the rear frame 14, respectively, and the right end portions and the left end portions (near both left and right edges) in the outer peripheral portions overlap, from a lower side, the first joint surfaces 151 of the left and right side frames 15. In this state, the upper surface of the lower panel 11 contacts with the lower surfaces of the flange portions 163 of the respective crossing members 16.

The lower panel 11 and the heat sink 12 are joined to the first joint surface 131 of the front frame 13 by laser welding, at a location overlapping the first joint surface 131 of the front frame 13, and are joined to the first joint surface 141 of the rear frame 14 by laser welding, at a location overlapping the first joint surface 141 of the rear frame 14. The reference sign W1 in FIG. 6 indicates a joint location of the lower panel 11 and the heat sink 12 to the front frame 13.

Similarly, the lower panel 11 and the heat sink 12 are joined to the respective first joint surfaces 151 of the left and right side frames 15 by laser welding, at locations overlapping the first joint surfaces 151 of the left and right side frames 15. The reference sign W3 in FIG. 7 indicates a joint location of the lower panel 11 and the heat sink 12 to the right side frame 15.

Specifically, the lower panel 11 and the heat sink 12 are joined to the front frame 13, the rear frame 14, and the left and right side frames 15 by applying a laser to the outer peripheral portion of the heat sink 12 from a lower side. At this time, the lower panel 11 and the heat sink 12 are joined to each other. The first joint surfaces 131 and 141 of the front frame 13 and the rear frame 14 and the first joint surfaces 151 of the left and right side frames 15 are surfaces provided at the lower portions of the respective frames 13, 14, and 15 and facing downward. Thus, a laser can be applied from a lower side of the lower panel 11 and the heat sink 12 to the outer peripheral portions of the lower panel 11 and the heat sink 12 in a state where these outer peripheral portions overlap, from the lower side, the first joint surfaces 131, 141, and 151 of the front frame 13, the rear frame 14, and the left and right side frames 15, i.e., overlap the first joint surfaces 131, 141, and 151 in the up-down direction.

Figure 8:
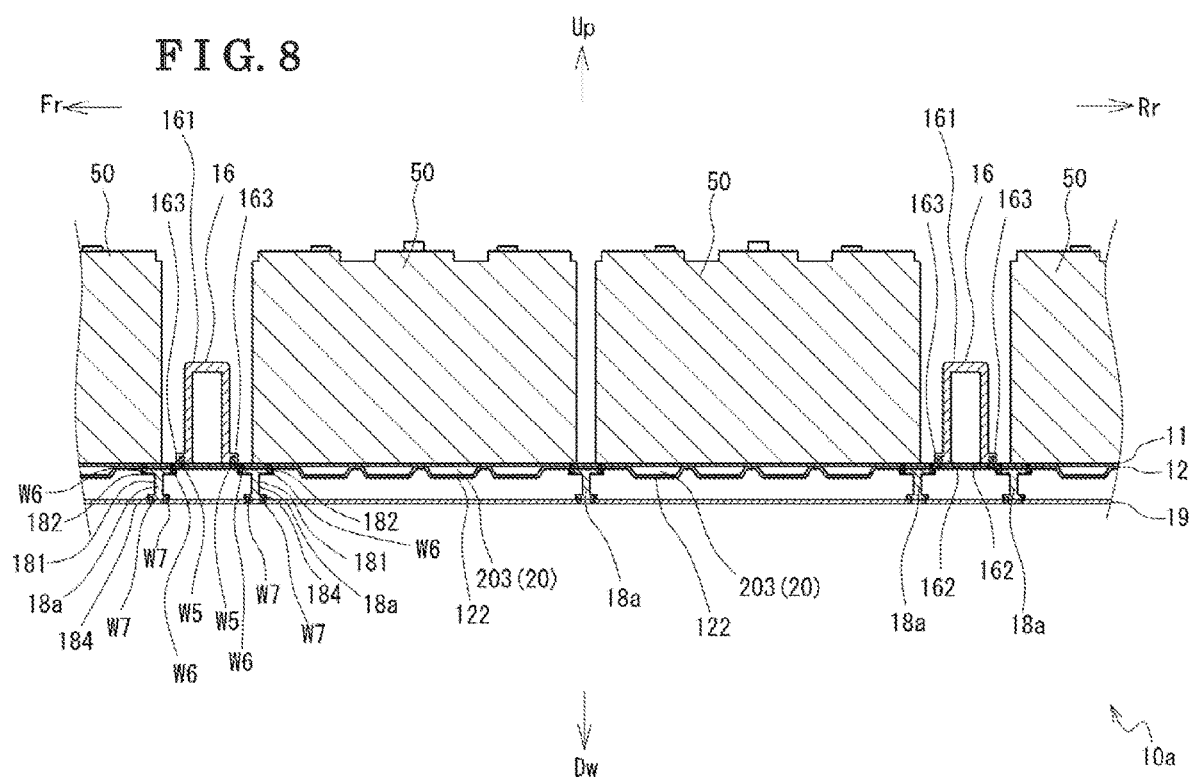
FIG. 8 is a sectional view illustrating the configuration of the battery case according to the embodiment of this disclosure.

The flange portion 163 of the crossing member 16 and the lower panel 11 (the superimposed body of the lower panel 11 and the heat sink 12) are joined to each other by laser welding. FIG. 8 is a sectional view taken by cutting of the battery case 10a along a plane perpendicular to the left-right direction, and is the sectional view illustrating arrangement positions of the lower frames 18a and a positional relation between the crossing member 16 and the lower frames 18a. The reference sign W5 in FIG. 8 indicates a joint location between the flange portion 163 of the crossing member 16 and the lower panel 11 (the superimposed body of the lower panel 11 and the heat sink 12). As illustrated in FIG. 8, the lower panel 11 and the heat sink 12 can be joined to the flange portion 163 of the crossing member 16 by applying a laser from a lower side to a part included in the heat sink 12 and overlapping the flange portion 163 of the crossing member 16 when viewed in the up-down direction. At this time, the lower panel 11 and the heat sink 12 are joined to each other at the part to which the laser is applied.

The flange portions 163 of each crossing member 16 are joined (i.e., linearly welded) to the lower panel 11 continuously over the entire length in the longitudinal direction. According to such a configuration, it is possible to enhance an advantageous effect of protecting the battery modules 50 by the crossing member 16, particularly an advantageous effect of preventing or suppressing deformation of the left and right side frames 15 at the time of a side collision. In other words, the crossing member 16 having an open cross-sectional shape has smaller rigidity (more easily deforms) than a crossing member having a closed cross-sectional shape (e.g., an angular-tube shape). In view of it, according to this embodiment, the flange portions 163 of the crossing member 16 are joined continuously over the entire length in the longitudinal direction. With such a configuration, the opening of the crossing member 16 is closed by the lower panel 11 (i.e., the opening ends 162 are connected to each other), and thus, it is possible to achieve an advantageous effect similar to that of the configuration where the crossing member 16 having the closed cross-sectional shape is arranged.

A plurality of the lower frames 18a are arranged on a lower side of the heat sink 12. Specifically, a plurality of the lower frames 18a are arranged between the branch path groups 203 adjacent to each other, between the frontmost branch path group 203 and the front frame 13, and between the rearmost branch path group 203 and the rear frame 14. Thus, as illustrated in FIG. 8, the three lower frames 18a are arranged in a region between the crossing members 16 adjacent to each other. The similar matter applies to a region between the frontmost crossing member 16 and the front frame 13, and a region between the rearmost crossing member 16 and the rear frame 14.

The front-side lower frame 18a included in the three lower frames 18a arranged in each of the regions and the rear-side lower frame 18a included in the three lower frames 18a arranged in the region adjacent from the front side to that region are arranged in such a way as to be adjacent from the rear and front sides to the crossing member 16 between these two regions, when viewed in the up-down direction. Specifically, when viewed in the up-down direction, the temperature control path 20 does not exist between the crossing member 16 and these two lower frames 18a, and the crossing member 16 and these two lower frames 18a are close to each other. When viewed in the up-down direction, the crossing member 16 and these two lower frames 18a are preferably as close as possible to each other. However, when viewed in the up-down direction, the flange portions 163 of the crossing member 16 and the first flange portions 182 of these two lower frames 18a are displaced from each other in the front-rear direction, and do not overlap each other. For example, as illustrated in FIG. 8, front-rear direction positions of the front-rear direction end surfaces of the flange portions 163 of the crossing member 16 coincide with front-rear direction positions of the front-rear direction end surfaces of the first flange portions 182 of the two lower frames 18a, or are displaced from these front-rear direction positions by an extremely small distance in the front-rear direction.

The first flange portions 182 of a plurality of the lower frames 18a arranged on a lower side of the heat sink 12 extend in the front-rear direction along a lower surface of the heat sink 12. Upper surfaces of the first flange portions 182 of a plurality of the lower frames 18a face the lower surface of the heat sink 12. Thus, the first flange portions 182 including the upper surfaces facing the lower surface of the heat sink 12 are provided at the upper end portions of a plurality of the lower frames 18a. The first flange portion 182 of each lower frame 18a and the heat sink 12 (the superimposed body of the lower panel 11 and the heat sink 12) are joined to each other by laser welding. The reference signs W6 in FIG. 6 and FIG. 7 each indicate a joint location between the first flange portion 182 of the lower frame 18a and the heat sink 12 (the superimposed body of the lower panel 11 and the heat sink 12). Specifically, the first flange portion 182 of each lower frame 18a is joined to the heat sink 12 (the superimposed body of the lower panel 11 and the heat sink 12) by applying a laser from a lower side to the first flange portion 182 of each lower frame 18a. Since a width of the second flange portion 184 of the lower frame 18a (a width-direction length of the second protrusion portion 185) is shorter than a width of the first flange portion 182 (a width-direction length of the first protrusion portion 183), a laser can be applied to the first flange portion 182 of each lower frame 18a from a lower side without being blocked by the second flange portion 184.

Each crossing member 16 can be joined to the lower panel 11 and the heat sink 12 even after the lower frames 18a are arranged on a lower side of the heat sink 12 (in a state where the lower frames 18a are arranged on a lower side of the heat sink 12). In other words, when viewed in the up-down direction, the flange portions 163 of each crossing member 16 do not overlap the first flange portion 182 of the lower frame 18a, and thus, the first flange portion 182 of the lower frame 18a do not overlap parts included in the lower panel 11 and the heat sink 12 and overlapping the flange portions 163 of each crossing member 16. Further, since a width of the second flange portion 184 of the lower frame 18a (a width-direction length of the second protrusion portion 185) is shorter than a width of the first flange portion 182 (a width-direction length of the first protrusion portion 183), the parts included in the lower panel 11 and the heat sink 12 and overlapping the flange portions 163 of each crossing member 16 do not overlap the second flange portion 184 of the lower frame 18a, when viewed in the up-down direction. Accordingly, a laser can be applied from a lower side of the heat sink 12 to the parts included in the lower panel 11 and the heat sink 12 and overlapping the flange portions 163 of each crossing member 16 without being blocked by the first flange portion 182 and the second flange portion 184 of the lower frame 18a.

After the respective members are joined to each other, the shared panel 19 is arranged on a lower side of the front frame 13, the rear frame 14, the left and right side frames 15, the crossing members 16, the lower panel 11, the heat sink 12, and the lower frames 18a. At this time, the shared panel 19 is arranged in such a way that the outer peripheral portion of the shared panel 19 overlap, from a lower side, the second joint surfaces 132 and 142 of the front frame 13 and the rear frame 14 and the second joint surfaces 152 of the left and right side frames 15. In this state, a lower surface of the second flange portion 184 of each lower frame 18a contacts with an upper surface of the shared panel 19.

Then, a front end portion (the portion near a front edge) of the shared panel 19 is joined to the second joint surface 132 of the front frame 13, a rear end portion (the portion near a rear edge) of the shared panel 19 is joined to the second joint surface 142 of the rear frame 14, and both left and right end portions (the portions near both the left and right edges) of the shared panel 19 are joined to the respective second joint surfaces 152 of the left and right side frames 15. In other words, an outer peripheral portion of the shared panel 19 is joined to the second joint surfaces 132, 142, and 152 in a state of overlapping the second joint surfaces 132, 142, and 152 in the up-down direction. The reference sign W2 in FIG. 6 indicates a joint location between the shared panel 19 and the second joint surface 132 of the front frame 13. The reference sign W4 in FIG. 7 indicates a joint location between the shared panel 19 and the second joint surface 152 of the side frame 15. Specifically, the outer peripheral portion of the shared panel 19 is joined to the second joint surfaces 132, 142, and 152 of the front frame 13, the rear frame 14, and the left and right side frames 15 by applying a laser from a lower side to the outer peripheral portion of the shared panel 19.

Further, the second flange portion 184 of each lower frame 18a and the shared panel 19 are joined to each other. The reference signs W7 in FIG. 6 and FIG. 8 each indicate a joint location between the shared panel 19 and the lower frame 18a. As illustrated in FIG. 8, the second flange portion 184 of the lower frame 18a extends in the front-rear direction along the upper surface of the shared panel 19. Thus, the lower surface of the second flange portion 184 of the lower frame 18a faces the upper surface of the shared panel 19. In other words, the second flange portion 184 including the lower surface facing the upper surface of the shared panel 19 is provided at the lower end portion of the lower frame 18a. Then, the shared panel 19 and each lower frame 18a are joined to each other by applying a laser from a lower side to the part included in the shared panel 19 and overlapping the second flange portion 184 of the lower frame 18a. Thereby, each lower frame 18a is arranged between the shared panel 19 (outer bottom plate portion) and the superimposed body (inner bottom plate portion) of the lower panel 11 and the heat sink 12, is joined, at the first flange portion 182, to the superimposed body of the lower panel 11 and the heat sink 12, and is joined, at the second flange portion 184, to the shared panel 19.

According to such a configuration, the lower panel 11, the heat sink 12, the lower frames 18a, and the shared panel 19 can be joined from a lower side of the front frame 13, the rear frame 14, and the left and right side frames 15. In other words, the lower panel 11, the heat sink 12, the lower frames 18a, and the shared panel 19 can be attached in one direction. Accordingly, it is not necessary to change an up-down direction orientation of each member during the manufacturing of the battery case 10a, and thus, the number of manufacturing steps can be reduced. Further, a laser may be applied only from a lower side, and thus, the manufactured is enabled with equipment that can apply a laser from one direction. Accordingly, manufacturing cost can be reduced.

In fact, the battery case 10a can be manufactured with each member being at an orientation of being turned upside down. In other words, the lower panel 11, the heat sink 12, and a plurality of the lower frames 18a are placed on an upper side of (in the state of being attached to the vehicle, a lower side of) the front frame 13, the rear frame 14, and the left and right side frames 15 that have been turned upside down, and a laser is applied from an upper side of these so that these can be joined to each other. After that, the shared panel 19 is placed on an upper side of these, and a laser is applied from an upper side so that the shared panel 19 can be joined to the front frame 13, the rear frame 14, the left and right side frames 15, and the lower frames 18a.

Further, since the heat sink 12 and the shared panel 19 are separated from each other in the up-down direction, it is possible to reduce impact applied to the heat sink 12 when external force is applied from a lower side. In other words, in a configuration where the heat sink 12 and the shared panel 19 contact directly with each other, external force applied to the shared panel 19 is directly transmitted from the shared panel 19 to the heat sink 12. Thus, in such a configuration, the external force is easily applied to the battery modules 50. Further, in the configuration where the heat sink 12 and the shared panel 19 contact directly with each other, when the shared panel 19 is deformed, the heat sink 12 is also deformed. Thus, in such a configuration, when the shared panel 19 is deformed by external force or the like, the heat sink 12 is deformed accordingly, and as a result, the path wall portion 122 may be damaged and temperature control fluid may leak from the temperature control path 20.

In contrast to this, according to this embodiment, the heat sink 12 and the shared panel 19 are separated from each other in the up-down direction, and thus, external force applied to the shared panel 19 is not transmitted directly to the heat sink 12. Accordingly, when external force is applied from a lower side of the battery case 10a, impact applied to the battery module 50 can be reduced. Further, since the heat sink 12 and the shared panel 19 are separated from each other, even when the shared panel 19 is deformed, deformation of the heat sink 12 can be prevented or suppressed. Thus, damage of the path wall portion 122 can be prevented or suppressed so that a leak of the temperature control fluid can be prevented or suppressed. In addition, external force applied to the shared panel 19 from a lower side is transmitted to the heat sink 12 via the lower frame 18a joined to the shared panel 19. Here, the lower frame 18a is joined to the portion that is included in the heat sink 12 and that is not the path wall portion 122, and thus, the external force does not act directly on the path wall portion 122. Such a configuration can also prevent or suppress damage of the path wall portion 122.

Further, according to this embodiment, the crossing member 16 and the lower frame 18a do not overlap each other in the up-down direction, and are adjacent to each other. According to such a configuration, when external force is applied to the shared panel 19 from a lower side, the external force applied to the battery module 50, the lower panel 11, and the heat sink 12 can be reduced. In addition, according to such a configuration, deformation of the shared panel 19, the lower panel 11, and the heat sink 12 can be reduced. In other words, when external force is applied to the shared panel 19 from a lower side, the external force is transmitted to the lower panel 11 and the heat sink 12 via the lower frame 18a. Since the crossing member 16 and the lower frame 18a are provided adjacent to each other, external force transmitted from the lower frame 18a to the lower panel 11 and the heat sink 12 is transmitted to the crossing member 16 provided adjacent to the lower frame 18a, and is received by the crossing member 16. Accordingly, deformation of the shared panel 19, the lower panel 11, and the heat sink 12 can be prevented or suppressed. In other words, rigidity of the battery case 10a can be enhanced by the configuration where the crossing member 16 and the lower frame 18a are arranged adjacent to each other.

Further, in the case of the configuration where the crossing member 16 and the lower frame 18a are adjacent to each other when viewed in the up-down direction, even in a state where the lower frame 18a is arranged on a lower side of the heat sink 12, the crossing member 16 can be joined to the lower frame 18a and the heat sink 12 by applying a laser from a lower side.

Furthermore, the crossing member 16 has the open cross-sectional shape, and the crossing member 16 is joined linearly to the lower panel 11 and the heat sink 12. With such a configuration, the battery case 10a can be reduced in weight, and rigidity of the battery case 10a can be prevented from being reduced or can be enhanced. In other words, the crossing member 16 has the open cross-sectional shape, and thereby, the crossing member 16 can be reduced in weight, compared with a configuration where the crossing member 16 has a closed cross-sectional shape. Thus, the battery case 10a can be reduced in weight. In addition, the flange portions 163 of the crossing member 16 are joined continuously and linearly to the lower panel 11 and the heat sink 12, and thereby, parts included in the lower panel 11 and the heat sink 12 and positioned between the flange portions 163 of the crossing member 16 function as one part of the crossing member 16. In other words, it is possible to achieves an advantageous effect similar to that of the configuration where the crossing member 16 having the closed cross-sectional shape is arranged. Thus, rigidity of the battery case 10a can be prevented or suppressed from becoming lower than that of the configuration where the crossing member having the closed cross-sectional shape (or, can be made higher than a configuration where the crossing member 16 is not joined linearly to the lower panel 11 and the heat sink 12).

First Modified Example

Figure 9:
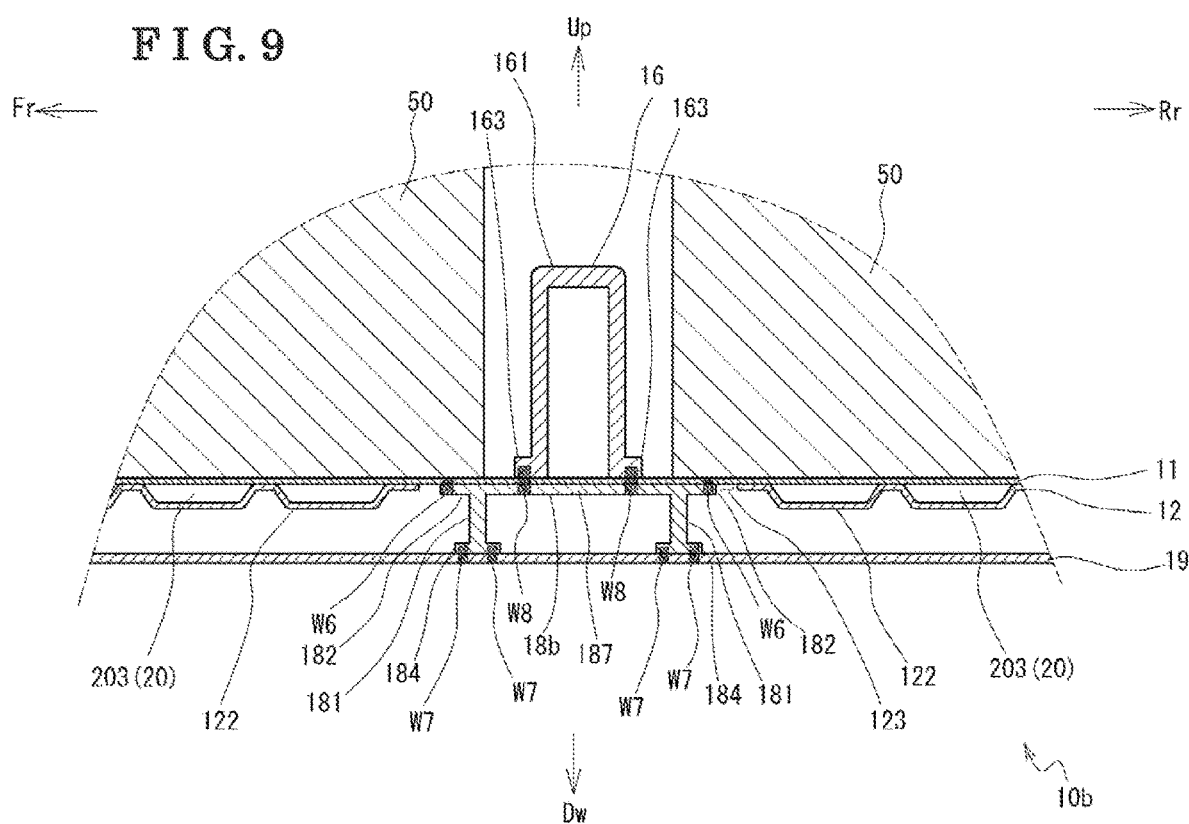
FIG. 9 is a sectional view illustrating a configuration of a battery case according to a first modified example.

Next, a first modified example is described. FIG. 9 is a sectional view illustrating a configuration of the battery case 10b according to the first modified example, and is the sectional view taken by cutting along a plane perpendicular to the left-right direction. In the above-described embodiment, one lower frame 18a is arranged on each of front and rear sides of the crossing member 16 in the top view, whereas in the first modified example, one lower frame 18b overlapping the crossing member 16 in the top view is arranged.

As illustrated in FIG. 9, the heat sink 12 is provided with an opening 123 between the branch path groups 203 adjacent to each other in the front-rear direction. Although omitted in FIG. 9, the central concentration paths 201 are provided in the central portion of the heat sink 12, and the outer peripheral concentration paths 202 are provided at both left and right ends of the heat sink 12. Accordingly, the opening 123 is a through hole provided in a region surrounded by the branch route groups 203 adjacent to each other in the front-rear direction, the central concentration path 201, and the outer peripheral concentration path 202.

The lower frame 18b includes two leg portions 181, a pair of first flange portions 182, a connection portion 187, and a pair of second flange portions 184. An extruded aluminum material is applied to the lower frame 18b. The respective two leg portions 181 are parts long in the left-right direction and having standing-wall shapes, and are parallel to each other and separated from each other in the front-rear direction. A pair of the first flange portions 182 are parts having flat-plate shapes and extending from respective upper ends of the two leg portions 181 in the opposite width directions (both front and rear directions). The connection portion 187 is a part having a flat-plate shape and connecting a pair of the first flange portions 182 to each other. A pair of the first flange portions 182 and the connecting portion 187 include upper surfaces that are flat surfaces perpendicular to the up-down direction. A pair of the second flange portions 184 are parts having flat-plate shapes and extending from respective lower end portions of the two standing-wall portions in the opposite width directions (both front and rear directions). Lower surface of a pair of the second flange portions 184 are flat surfaces perpendicular to the up-down direction. A pair of the second flange portions 184 are not connected to each other, and are separated from each other. Thus, the lower frame 18b has a substantially "Π"-shaped cross section when viewed in the left-right direction. A distance between a pair of the second flange portions 184 is larger than a width-direction dimension (front-back direction dimension) of the crossing member 16. Accordingly, the crossing member 16 do not overlap the second flange portions 184 in the up-down direction.

As illustrated in FIG. 9, the flange portions 163 of the crossing member 16 overlap the connection portion 187 of the lower frame 18b when viewed in the up-down direction, whereas the flange portions 163 of the crossing member 16 do not overlap the second flange portions 184 of the lower frame 18b. The connection portion 187 and the first flange portions 182 of the lower frame 18b are located inside the opening provided in the heat sink 12, and include upper surfaces contacting with the lower surface of the lower panel 11. The flange portions 163 of the crossing member 16 and the connection portion 187 are joined to the lower panel 11. Although omitted in FIG. 9, the same configuration as that of the lower frame 18a of the above-described embodiment is applied to the lower frames 18b arranged at positions that are not adjacent to the crossing member 16 in the front-rear direction.

In comparison between a method for manufacturing the battery case 10b according to the first modified example and the method for manufacturing the battery case 10a according to the above-described embodiment, in the above-described embodiment, a laser is applied from a lower side of the heat sink 12, thereby joining the lower panel 11 to the crossing member 16, whereas in the first modified example, a laser is applied from a lower side of the connection portion 187 of the lower frame 18b, thereby joining the crossing member 16 to the lower panel 11 and joining the lower panel 11 to the connection portion 187 of the lower frame 18b. In other words, the crossing member 16, the lower panel 11, and the lower frame 18b are joined integrally to each other by the laser welding. The reference signs W8 in FIG. 9 each indicate a location where the crossing member 16, the lower panel 11, and the lower frame 18b are joined to each other. The flange portions 163 of the crossing member 16 are arranged at positions that do not overlap the second flange portions 184 of the lower frame 18b when viewed in the up-down direction. Thus, a laser can be applied from a lower side of the lower frame 18b to positions where the flange portions 163 of the crossing member 16, the lower panel 11, and the connection portion 187 of the lower frame 18b overlap each other, without being blocked by the second flange portions 184 of the lower frame 18b. Accordingly, one-direction attaching is enabled similarly to the above-described embodiment.

Further, according to the first modified example, the number of the lower frames 18b can be reduced, thereby enabling the number of attaching steps to be reduced. Furthermore, the lower frame 18b and the crossing member 16 can be together joined, thereby enabling the number of joining steps to be reduced. Accordingly, manufacturing cost can be reduced. In addition, according to the first modified example, the opening is provided in the heat sink 12, thereby enabling the battery case 10b to be reduced in weight.

Second Modified Example

Figure 10:
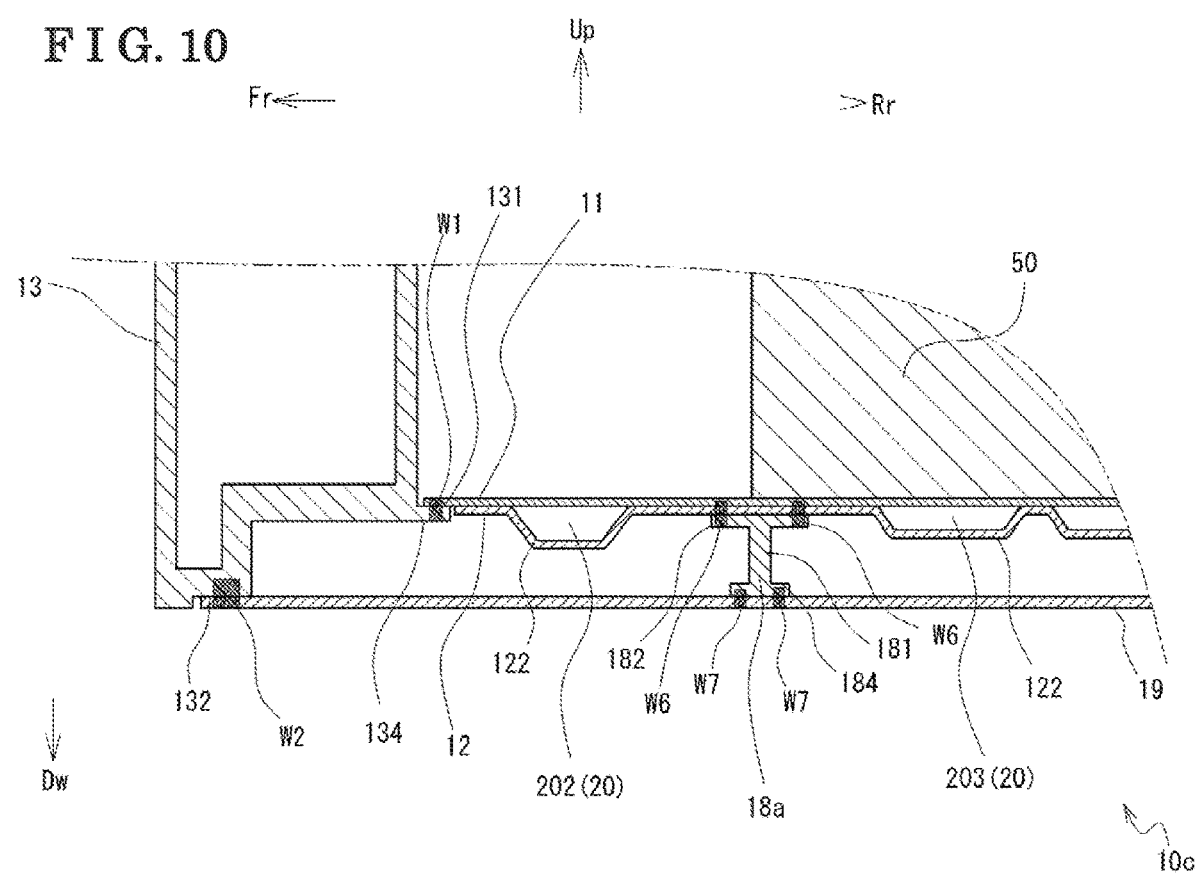
FIG. 10 is a sectional view illustrating a configuration of a battery case according to a second modified example.

Next, a battery case 10c according to the second modified example is described. The second modified example is an example where structures of joining the front frame 13, the rear frame 14, and the side frames 15 to the lower panel 11 and the heat sink 12 are different from that of the above-described embodiment. FIG. 10 is a sectional view illustrating the structure of joining the front frame 13 to the lower panel 11 in the battery case 10c according to the second modified example, and is the sectional view taken by cutting along a plane perpendicular to the left-right direction. Although omitted in the drawing, the structures of joining the rear frame 14 and the left and right side frames 15 to the lower panel 11 and the heat sink 12 are the same as that illustrated in FIG. 10.

Lower portions of the front frame 13 and the rear frame 14 are provided with extension portions 134 extending to mutually facing sides. These extension portions 134 include upper surfaces as the first joint surfaces 131 and 141. The first joint surfaces 131 and 141 (the upper surfaces of the extension portions 134) are flat surfaces perpendicular to the up-down direction. The first joint surfaces 131 and 141 and the second joint surfaces 132 and 142 are displaced from each other in the front-rear direction and in the up-down direction, and do not overlap each other when viewed in the up-down direction. The first joint surfaces 131 and 141 (i.e., the upper surfaces of the extension portions 134) are located on an upper side of the second joint surfaces 132 and 142.

Similarly, lower portions of the left and right side frames 15 are provided with rib-shaped extension portions 134 extending to mutually facing sides. These extension portions include upper surfaces as the first joint surfaces 151. The first joint surfaces 151 are flat surfaces perpendicular to the up-down direction. The first joint surface 151 and the second joint surface 152 are displaced from each other in the left-right direction and in the up-down direction, and do not overlap each other when viewed in the up-down direction. The first joint surface 151 is located on an upper side of the second joint surface 152.

The heat sink 12 is arranged in such a way as to overlap the lower panel 11 from a lower side. However, the heat sink 12 is smaller than the lower panel 11, and the heat sink 12 does not overlap the outer peripheral portion of the lower panel 11. The front end portion and the rear end portion of the outer peripheral portion that is included in the lower panel 11 and that the heat sink 12 does not overlap are joined to the first joint surfaces 131 and 141 of the front frame 13 and the rear frame 14, respectively, in a state of being arranged on an upper side of the first joint surfaces 131 and 141 (in a state of overlapping the extension portions 134 from upper sides). Similarly, the right end portion and the left end portion of the outer peripheral portion of the lower panel 11 are connected to the first joint surfaces 151 of the side frames 15, in a state of being arranged on an upper side of the first joint surfaces 151.

In the method for manufacturing the battery case 10a according to the above-described embodiment, the lower panel 11 and the heat sink 12 are joined to the front frame 13, the rear frame 14, and the left and right side frames 15 by applying a laser from a lower side of the heat sink 12. In contrast to this, in a method for manufacturing the battery case 10c according to the second modified example, the lower panel 11 is joined to the first joint surface that is the upper surface of each of the extension portions of the front frame 13, the rear frame 14, and the left and right side frames 15 by applying a laser from a lower side to the extension portions 134 of the front frame 13 and the rear frame 14 and the extension portions of the left and right side frames 15. Accordingly, one-direction attaching is enabled similarly to the above-described embodiment.

Further, according to the second modified example, the outer peripheral portion of the lower panel 11 is located on an upper side of the extension portions 134 of the front frame 13 and the rear frame 14 and the extension portions of the left and right side frames 15. Thus, when the battery modules 50 are placed on an upper side of the lower panel 11, weight of the battery modules 50 can be received by the extension portions 134 of the front frame 13 and the rear frame 14 and the extension portions of the left and right side frames 15. In other words, a joined location W1 between the outer peripheral portion of the lower panel 11 and the first joint surfaces 131 and 141 of the front frame 13 and the rear frame 14 does not receive force in a mutually separating direction. Accordingly, durability of the battery case 10c can be improved.

Furthermore, in the second modified example, the lower panel 11 is joined to the first joint surfaces 131 and 141 of the front frame 13 and the rear frame 14, and is joined to the first joint surfaces 151 of the left and right side frames 15. Boundary surfaces between the lower panel 11 and the heat sink 12 are not located on an upper side of the first joint surfaces 131 and 141 of the front frame 13 and the rear frame 14 and the first joint surfaces 151 of the left and right side frames 15. Accordingly, even when the lower panel 11 and the heat sink 12 are partially separated from each other at the boundary surfaces for example, and the temperature control fluid leaks out from the separated location, the leaking temperature control fluid flows on a lower side of the first joint surfaces 131, 141, and 151, and does not flows into a space (the space where the battery modules 50 are arranged) on an upper side of the lower panel 11 that is on an upper side of the first joint surfaces 131, 141, and 151. Thus, the leaking temperature control fluid is prevented from contacting with the battery modules 50.

Although the embodiment of this disclosure described above, this disclosure is not limited to the above-described embodiment.

For example, although an example where laser welding is applied for joining the respective members to each other is given in the above-described embodiment, a method for joining the respective members to each other is not limited to laser welding. For example, the respective members may be configured in such a way as to be joined to each other by friction stir welding (FSW). Briefly, any joining methods that enable the members superimposed on each other to be joined to each other from one side in the superimposing direction may be used.

Dimensions and shapes of the front frame 13, the rear frame 14, and the side frames 15 are not limited to the ones in the above-described embodiment. The numbers of the accommodatable battery modules 50, the crossing members 16, and the lower frames 18a or 18b are not limited. Materials of the lower panel 11, the heat sink 12, the front frame 13, the rear frame 14, the side frames 15, the crossing members 16, the crossing-member support members 17, the lower frames 18a and 18b, and the share panel 19 are not limited to aluminum. Various types of metal materials can be applied to each of these members.

A vehicular battery case according to this disclosure includes a plate-shaped inner bottom plate portion, a plate-shaped outer bottom plate portion, a lower frame, and a frame body. A battery is mountable on an upper surface side of the inner bottom plate portion. The outer bottom plate portion is arranged on a lower side of the inner bottom plate portion in such a way as to be separated from the inner bottom plate portion. The lower frame is arranged between the inner bottom plate portion and the outer bottom plate portion. The frame body is provided in such a way as to stand upward from outer peripheral portions of the inner bottom plate portion and the outer bottom plate portion. The frame body includes a lower portion where first and second joint surfaces are formed. The first joint surface faces upward or downward. The second joint surface faces downward, and is on an outer side of and on a lower side of the first joint surface in the frame body. The lower frame includes an upper end portion provided with a first flange portion including an upper surface facing a lower surface of the inner bottom plate portion. The inner bottom plate portion includes the outer peripheral portion that is joined to the first joint surface in a state of overlapping the first joint surface in an up-down direction. The outer bottom plate portion includes the outer peripheral portion that is joined to the second joint surface in a state of overlapping the second joint surface in an up-down direction. The first flange portion of the lower frame is joined to the lower surface of the inner bottom plate portion.

According to this disclosure, the inner bottom plate portion and the outer bottom plate portion can be joined to the frame body from a lower side, and the lower frame can be joined to the inner bottom plate portion from a lower side. In other words, these members can be attached from one direction. Thus, it is not necessary to change an orientation (particularly, an orientation with respect to an up-down direction) of each of these members during manufacturing of the battery case, and thereby the number of manufacturing steps can be reduced. Therefore, manufacturing cost can be reduced.

In this disclosure, the terms "upper" and "lower" used for each member constituting the battery case indicate upper and lower sides of the battery case in a state of accommodating a battery and attaching the battery to a vehicle. Accordingly, for example, concerning the inner bottom plate portion of the battery case before attaching to the vehicle, a surface on which a battery is to be mounted is an upper surface, and a surface opposite to the upper surface is a lower surface. Concerning other members, surfaces whose orientations are the same as that of the upper surface (lower surface) of the inner bottom plate portion are upper surfaces (lower surfaces), and the same sides as that of the upper surface (lower side) of the inner bottom plate portion are the upper sides (lower sides). In this disclosure, the frame body is formed in such a way as to have a predetermined thickness in a width direction perpendicular to outer peripheral directions of the inner bottom plate portion and the outer bottom plate portion, when viewed from the up-down direction, and "outer side" of the frame body indicates a side being farther away in the width direction of the frame body from an opening surrounded by the frame body. In the opposite manner, "inner side" of the frame body indicates a side becoming closer in the width direction of the frame body to the opening surrounded by the frame body In the vehicular battery case according to this disclosure, a second flange portion may be provided at a lower end portion of the lower frame. The second flange portion may include a lower surface facing an upper surface of the outer bottom plate portion. The second flange portion of the lower frame may be joined to the upper surface of the outer bottom plate portion.

According to such a configuration, the upper surface of the outer bottom plate portion can be joined to the second flange portion of the lower frame from a lower side at a location where the second flange portion overlaps the outer bottom plate portion when viewed in the up-down direction. Accordingly, the battery case can be assembled from one direction, and thus, manufacturing cost can be reduced.

In the vehicular battery case according to this disclosure, the lower frame may be formed in an elongated shape, and include a leg portion formed in such a way as to extend in an up-down direction over a longitudinal direction. The first flange portion may be constituted of a pair of first protrusion portions extending from an upper end of the leg portion in mutually opposite directions toward width directions of the lower frame. The second flange portion may be constituted of a pair of second protrusion portions extending from a lower end of the leg portion in mutually opposite directions toward width directions of the lower frame. A length of the second protrusion portion may be shorter than a length of the first protrusion portion.

According to such a configuration, the first flange portion includes a part that does not overlap the second flange portion when viewed in the up-down direction, and thus, the non-overlapping part can be accessed from a lower side without being blocked by the second flange portion. For this reason, processing of joining the non-overlapping part to the inner bottom plate portion can be performed from a lower side. Accordingly, with such a configuration, the lower frame can be attached in one direction from a lower side similarly to other members. As a result, manufacturing cost of the battery case can be reduced.

In the vehicular battery case according to this disclosure, a rod-shaped crossing member may be arranged on an upper surface side of the inner bottom plate portion, the crossing member extending along the upper surface of the inner bottom plate portion. A lower end portion of the crossing member may be joined to the upper surface of the inner bottom plate portion.

According to such a configuration, rigidity of the battery case can be enhanced.

In the vehicular battery case according to this disclosure, a cross-sectional shape of the crossing member being cut by a plane perpendicular to a longitudinal direction of the crossing member may be an open cross-sectional shape including a body portion opened on a lower side and a pair of opening ends formed by opening on the lower side in the body portion. The crossing member may include flange portions that extend from the pair of opening ends in width directions in such a way as to be more separated from each other, and that extend in the longitudinal direction of the crossing member. The flange portion may be joined continuously to the upper surface of the inner bottom plate portion, along the longitudinal direction of the crossing member.

According to such a configuration, it is possible to achieve the same advantageous effect as that of a configuration in which a crossing member having a closed cross-sectional shape is arranged on an upper surface side of the inner bottom plate portion. Thus, while weight of the battery case can be reduced, rigidity of the battery case can be enhanced.

In the vehicular battery case according to this disclosure, the flange portion of the crossing member and the first flange portion of the lower frame may not overlap each other when viewed in an up-down direction.

According to such a configuration, a location where the flange portion of the crossing member overlaps the inner bottom plate portion is not covered by the lower frame. In other words, the location where the flange portion of the crossing member overlaps the inner bottom plate portion can be accessed from a lower side without being blocked by the lower frame. Thus, processing of joining can be applied from a lower side to the location where the flange portion of the crossing member overlaps the inner bottom plate portion. Accordingly, one-direction attaching can be performed, and thereby manufacturing cost of the battery case can be reduced.

In the vehicular battery case according to this disclosure, the first joint surface of the frame body may be a surface facing downward. The outer peripheral portion of the inner bottom plate portion may be joined to the first joint surface from a lower side.

According to such a configuration, the outer peripheral portion of the inner bottom plate portion can be made to overlap the first joint surface of the frame body from a lower side, and processing of joining can be applied from a lower side to the overlapping location. Thus, the inner bottom plate portion can be attached from one direction, and thereby manufacturing cost of the battery case can be reduced.

In the vehicular battery case according to this disclosure, the frame body may be provided with an extension portion extending inward. An upper surface of the extension portion may be the first joint surface. The outer peripheral portion of the inner bottom plate portion may be joined to the first joint surface from an upper side.

According to such a configuration, when a battery is mounted on an upper surface side of the inner bottom plate portion, weight of the battery can be received by the extension portion of the frame body. With such a configuration, in a state where the battery is mounted, mutually separating force is not applied between the first joint surface and the inner bottom plate portion. Thus, durability of the battery case can be enhanced.

A method for manufacturing a vehicular battery case according to this disclosure is a method for manufacturing a vehicular battery case that includes a plate-shaped inner bottom plate portion, a plate-shaped outer bottom plate portion, a lower frame, and a frame body. The inner bottom plate portion is configured in such a way that a battery is mountable on an upper surface side of the inner bottom plate portion. The outer bottom plate portion is arranged on a lower side of the inner bottom plate portion in such a way as to be separated from the inner bottom plate portion. The lower frame is arranged between the inner bottom plate portion and the outer bottom plate portion, and includes an upper end portion provided with a first flange portion including an upper surface facing a lower surface of the inner bottom plate portion. The frame body is provided in such a way as to stand upward from outer peripheral portions of the inner bottom plate portion and the outer bottom plate portion. The frame body includes a lower portion where first and second joint surfaces are formed. The first joint surface faces upward or downward. The second joint surface faces downward, and is on an outer side of and on a lower side of the first joint surface in the frame body. The method includes a step of joining the inner bottom plate portion to the frame body by applying a laser from a lower side to the outer peripheral portion of the inner bottom plate portion arranged in such a way as to overlap the first joint surface. The method further includes a step of joining the lower frame to the inner bottom plate portion by applying a laser from a lower side to the first flange portion of the lower frame arranged on a lower side of the inner bottom plate portion. The method further includes a step of joining the outer bottom plate portion to the frame body by applying a laser from a lower side to the outer peripheral portion of the outer bottom plate portion arranged in such a way as to overlap the second joint surface from a lower side.

When the battery case is configured in this manner, the inner bottom plate portion, the outer bottom plate portion, and the lower frame can be attached from a lower side. In other words, the battery case is assembled from one direction. Thus, manufacturing cost can be reduced.

A vehicular battery case according to this disclosure includes a plate-shaped inner bottom plate portion, a plate-shaped outer bottom plate portion, a lower frame, and a frame body. A battery is mountable on an upper surface side of the inner bottom plate portion. The outer bottom plate portion is arranged on a lower side of the inner bottom plate portion in such a way as to be separated from the inner bottom plate portion. The lower frame is arranged between the inner bottom plate portion and the outer bottom plate portion. The frame body is provided in such a way as to stand upward from outer peripheral portions of the inner bottom plate portion and the outer bottom plate portion. The frame body includes a lower portion where first and second joint surfaces are formed. The first joint surface is joined to the inner bottom plate portion. The second joint surface is on an outer side of the first joint surface in the frame body, and is joined to the outer bottom plate portion. The lower frame includes an upper end portion provided with a first flange portion including an upper surface facing a lower surface of the inner bottom plate portion. The first flange portion of the lower frame is joined by a laser to the lower surface of the inner bottom plate portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicular battery case comprising:
a plate-shaped inner bottom plate portion at which a battery is mountable on an upper surface side of the inner bottom plate portion;
a plate-shaped outer bottom plate portion that is arranged on a lower side of the inner bottom plate portion in such a way as to be separated from the inner bottom plate portion;
a lower frame that is arranged between the inner bottom plate portion and the outer bottom plate portion; and
a frame body that is provided in such a way as to stand upward from outer peripheral portions of the inner bottom plate portion and the outer bottom plate portion, wherein
the frame body includes a lower portion where first and second joint surfaces are formed, the first joint surface facing upward or downward, the second joint surface facing downward and being on an outer side of and on a lower side of the first joint surface in the frame body,
the lower frame includes an upper end portion provided with a first flange portion including an upper surface facing a lower surface of the inner bottom plate portion,
the inner bottom plate portion includes the outer peripheral portion that is joined to the first joint surface in a state of overlapping the first joint surface in an up-down direction,
the outer bottom plate portion includes the outer peripheral portion that is joined to the second joint surface in a state of overlapping the second joint surface in an up-down direction, and
the first flange portion of the lower frame is joined to the lower surface of the inner bottom plate portion.

2. The vehicular battery case according to claim 1, wherein
a second flange portion is provided at a lower end portion of the lower frame, the second flange portion including a lower surface facing an upper surface of the outer bottom plate portion, and
the second flange portion of the lower frame is joined to the upper surface of the outer bottom plate portion.

3. The vehicular battery case according to claim 2, wherein
the lower frame is formed in an elongated shape, and includes a leg portion formed in such a way as to extend in an up-down direction over a longitudinal direction,
the first flange portion is constituted of a pair of first protrusion portions extending from an upper end of the leg portion in mutually opposite directions toward width directions of the lower frame,
the second flange portion is constituted of a pair of second protrusion portions extending from a lower end of the leg portion in mutually opposite directions toward width directions of the lower frame, and
a length of the second protrusion portion is shorter than a length of the first protrusion portion.

4. The vehicular battery case according to claim 1, wherein
a rod-shaped crossing member is arranged on an upper surface side of the inner bottom plate portion, the crossing member extending along the upper surface of the inner bottom plate portion, and
a lower end portion of the crossing member is joined to the upper surface of the inner bottom plate portion.

5. The vehicular battery case according to claim 4, wherein
a cross-sectional shape of the crossing member being cut by a plane perpendicular to a longitudinal direction of the crossing member is an open cross-sectional shape including a body portion opened on a lower side and a pair of opening ends formed by opening on a lower side in the body portion,
the crossing member includes flange portions that extend from the pair of opening ends in width directions in such a way as to be more separated from each other, and that extend in the longitudinal direction of the crossing member, and
the flange portion is joined continuously to the upper surface of the inner bottom plate portion, along the longitudinal direction of the crossing member.

6. The vehicular battery case according to claim 5, wherein
the flange portion of the crossing member and the first flange portion of the lower frame do not overlap each other when viewed in an up-down direction.

7. The vehicular battery case according to claim 1, wherein
the first joint surface of the frame body is a surface facing downward, and
the outer peripheral portion of the inner bottom plate portion is joined to the first joint surface from a lower side.

8. The vehicular battery case according to claim 1, wherein
the frame body is provided with an extension portion extending inward,
an upper surface of the extension portion is the first joint surface, and
the outer peripheral portion of the inner bottom plate portion is joined to the first joint surface from an upper side.

9. A vehicular battery case comprising:
a plate-shaped inner bottom plate portion at which a battery is mountable on an upper surface side of the inner bottom plate portion;
a plate-shaped outer bottom plate portion that is arranged on a lower side of the inner bottom plate portion in such a way as to be separated from the inner bottom plate portion;
a lower frame that is arranged between the inner bottom plate portion and the outer bottom plate portion; and
a frame body that is provided in such a way as to stand upward from outer peripheral portions of the inner bottom plate portion and the outer bottom plate portion, wherein
the frame body includes a lower portion where a first joint surface being joined to the inner bottom plate portion, and a second joint surface being on an outer side of the first joint surface in the frame body and being joined to the outer bottom plate portion, are formed, the lower frame includes an upper end portion provided with a first flange portion including an upper surface facing a lower surface of the inner bottom plate portion, and the first flange portion of the lower frame is joined by a laser to the lower surface of the inner bottom plate portion.

\* \* \* \* \*